(12) United States Patent
Liu et al.

(10) Patent No.: US 11,664,886 B2
(45) Date of Patent: May 30, 2023

(54) ROUTING METHOD AND APPARATUS FOR SDN BASED LEO SATELLITE NETWORK

(71) Applicant: Beijing University of Posts and Telecommunications, Beijing (CN)

(72) Inventors: Liang Liu, Beijing (CN); Huadong Ma, Beijing (CN); Pengrui Duan, Beijing (CN); Dan Xia, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 68 days.

(21) Appl. No.: 16/856,721

(22) Filed: Apr. 23, 2020

(65) Prior Publication Data
US 2020/0343968 A1    Oct. 29, 2020

(30) Foreign Application Priority Data
Apr. 29, 2019  (CN) .......................... 201910356113.8

(51) Int. Cl.
*H04B 7/185* (2006.01)
*H04L 45/02* (2022.01)
(Continued)

(52) U.S. Cl.
CPC ..... *H04B 7/18521* (2013.01); *H04B 7/18554* (2013.01); *H04L 45/02* (2013.01); *H04L 45/38* (2013.01); *H04L 45/42* (2013.01); *H04L 45/64* (2013.01); *H04L 45/745* (2013.01); *H04W 40/248* (2013.01); *H04W 84/06* (2013.01)

(58) Field of Classification Search
CPC . H04B 7/18521; H04B 7/18554; H04L 45/02; H04L 45/38; H04L 45/42; H04L 45/64; H04L 45/745; H04W 40/248; H04W 84/06
See application file for complete search history.

(56) References Cited

U.S. PATENT DOCUMENTS

| | | | |
|---|---|---|---|
| 10,243,836 B2 | 3/2019 | Sackman et al. | |
| 2016/0037434 A1* | 2/2016 | Gopal | H04L 45/02 370/316 |

(Continued)

FOREIGN PATENT DOCUMENTS

| | | |
|---|---|---|
| CN | 106059650 A | 10/2016 |
| CN | 106603147 A | 4/2017 |

(Continued)

*Primary Examiner* — Jackie Zuniga Abad
(74) *Attorney, Agent, or Firm* — Renner, Otto, Boisselle & Sklar, LLP

(57) ABSTRACT

A routing method and apparatus for SDN-based LEO satellite network are disclosed. The LEO satellite network includes a control plane and a data plane. The control plane includes a central controller and a plurality of local controllers. The data plane includes a plurality of LEO satellite nodes and user terminals connecting to the LEO satellite nodes. The control plane may be located on the earth, and thus the centralized management and control of the data plane are placed on the earth. A local controllers monitors LEO satellite nodes in a subnet or subnets of the local controller. The distance between a local controller and a LEO satellite node is much smaller than the distance between a GEO satellite node and the LEO satellite node, and thus the time delay and the traffic loss of communication are reduced.

10 Claims, 11 Drawing Sheets

(51) Int. Cl.
   *H04L 45/00*    (2022.01)
   *H04L 45/42*    (2022.01)
   *H04L 45/64*    (2022.01)
   *H04L 45/745*   (2022.01)
   *H04W 40/24*    (2009.01)
   *H04W 84/06*    (2009.01)

(56) References Cited

U.S. PATENT DOCUMENTS

| | | | | |
|---|---|---|---|---|
| 2018/0359670 A1* | 12/2018 | Fang | .................... | H04W 36/08 |
| 2019/0140942 A1* | 5/2019 | Hu | ....................... | H04L 45/745 |
| 2019/0335253 A1* | 10/2019 | Gu | .................... | H04Q 11/0005 |
| 2020/0204439 A1* | 6/2020 | Scott | ....................... | H04L 45/64 |

FOREIGN PATENT DOCUMENTS

| | | | |
|---|---|---|---|
| CN | 108965029 A | | 12/2018 |
| CN | 109672625 A | | 4/2019 |
| WO | 2018/067889 A1 | | 4/2018 |

* cited by examiner

ROUTING METHOD AND APPARATUS FOR SDN BASED LEO SATELLITE NETWORK

CROSS REFERENCE TO RELATED APPLICATION

The present application claims priority to Chinese patent application No. 201910356113.8 filed on Apr. 29, 2019, and entitled "Routing Method and Apparatus for SDN-based LEO Satellite Networks", which is herein incorporated by reference in its entirety.

TECHNICAL FIELD

The present application relates to the technical field of space satellite network platform, in particular to a routing method and apparatus for SDN-based LEO satellite networks.

BACKGROUND

With the development of the spatial information technology, satellite networks play an increasingly important role in navigation and positioning, communication and broadcasting, meteorological prediction, and military. Space network platforms with a satellite network as the core become a strategic objective of continuous research and development in various countries. The satellite network becomes one of the most important part of the next generation communication network. The research of satellite networks is of great significance to the development of the spatial information technology.

At present, the satellite network architecture is mainly a multi-layered satellite network architecture based on an SDN (Software Defined Network). Such a network architecture includes a data plane, a control plane and a management plane. The data plane includes LEO (Low Earth Orbit) satellite nodes distributed around the world and user terminals accessing the LEO satellite nodes. The data plane runs protocols for forwarding data packets. The control plane includes at least three GEO (Geostationary Earth Orbit) satellite nodes that cover the earth, and realizes centralized management and control of the data plane, such as monitoring of status of links and network traffic, etc. The control plane sends status information of the satellite network to the management plane to obtain the entire topology of the satellite network. The management plane includes a network operation center and a network control center that are deployed on the ground. The management plane provides functions for various applications, including routing calculation, network virtualization, security, resource utilization, and mobility management, etc.

In the SDN-based multi-layered satellite network architecture, since the GEO satellite nodes are far away from the earth, the management and control of the data plane by the GEO satellite nodes and the synchronization of the topology of the satellite network by the management plane are time consuming, resulting in a large time delay and traffic loss for communication between user terminals.

SUMMARY

The objective of embodiments of the present invention is to provide a routing method and apparatus for an SDN-based LEO satellite network, to reduce time delay and traffic loss for communication.

In the first aspect, the present invention provides a routing method for an SDN-based LEO satellite network, which is applicable to a local controller in a control plane of an SDN-based LEO satellite network. The LEO satellite network includes the control plane and a data plane. The control plane includes a central controller and a plurality of local controllers. The data plane includes a plurality of LEO satellite nodes and user terminals connecting to the LEO satellite nodes. The method includes:

receiving a communication request message sent by a first satellite node, wherein the communication request message contains source terminal information of a source terminal that requests communication and destination address information of a destination terminal with which the source terminal requests communication, and the first satellite node is a satellite node to which the source terminal is connected;

searching a first user terminal information table for destination terminal information corresponding to the destination address information, wherein the first user terminal information table is stored in the local controller and contains terminal information of user terminals connected to satellite nodes in a subnet or subnets managed by the local controller;

sending the communication request message to the central controller if the destination terminal information is not found in the first user terminal information table, such that the central controller searches a second user terminal information table for the destination terminal information corresponding to the destination address information, and sends a communication response message containing the destination terminal information to the local controllers after the destination terminal information is found, wherein the second user terminal information table is stored in the central controller and contains terminal information of the user terminals connected to all the satellite nodes in the LEO satellite network;

receiving the communication response message sent by the central controller;

determining a first forwarding path from the source terminal to the destination terminal based on the source terminal information, the destination terminal information and pre-synchronized topology information of the LEO satellite network, and generating a first flow table entry; and sending the first flow table entry to satellite nodes corresponding to the first flow table entry in the subnet, such that the satellite nodes corresponding to the first flow table entry forwards a data message from the source terminal based on the first flow table entry.

In the second aspect, the present invention provides a routing method for an SDN-based LEO satellite network, which is applicable to a central controller in a control plane of the SDN-based LEO satellite network. The LEO satellite network includes the control plane and a data plane. The control plane includes the central controller and a plurality of local controllers. The data plane includes a plurality of LEO satellite nodes and user terminals connecting to the LEO satellite nodes. The method includes:

receiving a communication request message sent by a first local controller; wherein the communication request message contains source terminal information of a source terminal that requests communication and destination address information of a destination terminal with which the source terminal requests communication, and the first local controller is a local controller for managing a subnet comprising a first satellite node to which the source terminal is connected;

searching a second user terminal table for the destination terminal information corresponding to the destination address information; wherein the second user terminal information table is stored in the central controller and contains terminal information of the user terminals connected to all the satellite nodes in the LEO satellite network; and sending a communication response message containing the destination terminal information to the local controllers after the destination terminal information is found, such that the first local controller determines a forwarding path from the source terminal to the destination terminal based on the source terminal information, the destination terminal information and pre-synchronized topology information of the LEO satellite network, and generating a flow table entry, and sends the flow table entry to satellite nodes corresponding to the flow table entry in the subnet.

In the third aspect, the present invention further provides a routing apparatus for an SDN-based LEO satellite network, which is applicable to a local controller in a control plane of the SDN-based LEO satellite network. The LEO satellite network includes the control plane and a data plane. The control plane includes a central controller and a plurality of local controllers. The data plane includes a plurality of LEO satellite nodes and user terminals connecting to the LEO satellite nodes. The apparatus includes: a receiving module, a searching module, a sending module, and a path determination module.

The receiving module is configured for receiving a communication request message sent by a first satellite node, wherein the communication request message contains source terminal information of a source terminal that requests communication and destination address information of a destination terminal with which the source terminal requests communication, and the first satellite node is a satellite node to which the source terminal is connected.

The searching module is configured for searching a first user terminal information table for destination terminal information corresponding to the destination address information, wherein the first user terminal information table is stored in the local controller and contains terminal information of user terminals connected to satellite nodes in a subnet or subnets managed by the local controller.

The sending module is configured for sending the communication request message to the central controller if the destination terminal information is not found in the first user terminal information table, such that the central controller searches a second user terminal information table for the destination terminal information corresponding to the destination address information, and sends a communication response message containing the destination terminal information to the local controllers after the destination terminal information is found, wherein the second user terminal information table is stored in the central controller and contains terminal information of the user terminals connected to all the satellite nodes in the LEO satellite network.

The receiving module is further configured for receiving the communication response message sent by the central controller.

The path determination module is configured for determining a first forwarding path from the source terminal to the destination terminal based on the source terminal information, the destination terminal information and pre-synchronized topology information of the LEO satellite network, and generating a first flow table entry.

The sending module is further configured for sending the first flow table entry to satellite nodes corresponding to the first flow table entry in the subnet, such that the satellite nodes corresponding to the first flow table entry forwards a data message from the source terminal based on the first flow table entry.

In the fourth aspect, the present invention further provides a routing apparatus for an SDN-based LEO satellite network, which is applicable to a central controller in a control plane of the SDN-based LEO satellite network. The LEO satellite network includes the control plane and a data plane. The control plane includes a central controller and a plurality of local controllers. The data plane includes a plurality of LEO satellite nodes and user terminals connecting to the LEO satellite nodes. The apparatus includes: a receiving module, a searching module, and a sending module.

The receiving module is configured for receiving a communication request message sent by a first local controller; wherein the communication request message contains source terminal information of a source terminal that requests communication and destination address information of a destination terminal with which the source terminal requests communication, and the first local controller is a local controller for managing a subnet comprising a first satellite node to which the source terminal is connected.

The searching module is configured for searching a second user terminal table for the destination terminal information corresponding to the destination address information; wherein the second user terminal information table is stored in the central controller and contains terminal information of the user terminals connected to all the satellite nodes in the LEO satellite network.

The sending module is configured for sending a communication response message containing the destination terminal information to the local controllers after the destination terminal information is found, such that the first local controller determines a forwarding path from the source terminal to the destination terminal based on the source terminal information, the destination terminal information and pre-synchronized topology information of the LEO satellite network, generates a flow table entry, and sends the flow table entry to satellite nodes corresponding to the flow table entry in the subnet.

In the routing method and apparatus for an SDN-based LEO satellite network provided by the embodiments of the present invention, the LEO satellite network includes a data plane and a control plane. The data plane includes a plurality of LEO satellite nodes and user terminals connecting to the LEO satellite nodes. The control plane includes a central controller and a plurality of local controllers. A local controller receives a communication request message sent by a first satellite node in the data plane, and searches a first user terminal table for destination terminal information corresponding to the destination address information contained in the communication request message. If the destination terminal information is not found in the first user terminal table, the local controller sends the communication request message to the central controller. The central controller searches a second user terminal table for the destination terminal information. The local controller receives the destination terminal information sent by the central controller, determines a forwarding path from the source terminal to the destination terminal based on the source terminal information, the destination terminal information and pre-synchronized topology information of the LEO satellite network, and generates a flow table entry. The local controller sends the flow table entry to satellite nodes corresponding to the flow table entry in the subnet managed by the local controller, such that the satellite nodes may forward data messages sent by the source terminal based on the flow table entry. The control plane may be located on the earth, and thus the centralized management and control of the data plane are placed on the earth. A local controllers monitors LEO satellite nodes in a subnet or subnets of the local controller. The distance between a local controller and a LEO satellite node is much smaller than the distance between a GEO satellite node and the LEO satellite node, and thus the time delay and the traffic loss of communication are reduced.

BRIEF DESCRIPTION OF THE DRAWINGS

In order to more clearly explain the technical solutions of embodiments of the present invention or of the prior art, a brief description of the drawings will be given for describing the embodiments and of the prior art. Obviously, the drawings described below are merely for some of embodiments of the present invention and those skilled in the art may obtain other drawings without any creative efforts based on the drawings herein.

DETAILED DESCRIPTION

Figure 1A:
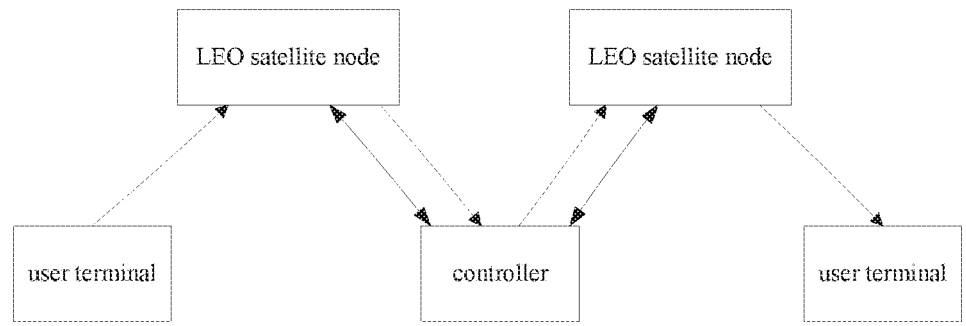
FIG. 1(a) is a schematic diagram showing the architecture of a Globalstar network architecture in the prior art.

Specific details are set forth to provide a thorough understanding of the technical solutions of the present invention with reference to the drawings of embodiments of the present invention. Obviously, the embodiments described are merely some of the embodiments of the present invention, instead of all embodiments. Any other embodiments obtained by those skilled in the art without any creative efforts are within the scope of protection of the present invention.

In order to reduce time delay and traffic loss in communication, the embodiments of the present invention provide a routing method, apparatus, local controller, central controller for an SDN-based LEO satellite network and a machine readable storage medium, which will be described in detail below.

Information related to terms as used herein are explained as follows.

GEO satellite node: a GEO satellite node is 35,000 km away from the earth. One GEO satellite node can cover nearly ⅓ of the surface of the earth, and three GEO satellite nodes can form a satellite network that substantially covers the whole world. There is a large time delay and traffic loss of transmission over satellite-ground links between GEO satellite nodes, and a low power ground station cannot directly access to the GEO satellite network.

LEO satellite node: an LEO satellite node is closer to the earth, generally 500 km to 1500 km away from the earth. A LEO satellite node covers a small area. Therefore, a large number of LEO satellite nodes are required to form a satellite network that covers the whole world.

SND: an SND is a network architecture that supports separation of the control and data plane and is software programmable. The SDN utilizes a centralized control plane and a distributed forwarding plane, which are separated from each other. The control plane can have a centralized control over network devices on the forwarding plane and provide flexible programmability. In the SDN architecture, the control plane provides southbound interfaces for communication of signaling between controllers and the network devices to achieve centralized control of the network devices. A network device in the forwarding plane generates a forwarding table from received control signaling, and processes data communicated between network devices based on the forwarding table. No complex distributed network protocol is required for data forwarding. SDN is a network architecture instead of a specific protocol, and the architecture may include a plurality of interface protocols. For example, a southbound interface protocol such as OpenFlow (open-sourced is used to implement interaction between an SDN controller and an SDN switch, and a northbound interface protocol is used to implement interaction between a service application and the SDN controller. An SDN-based network architecture is more systematic, and enables more efficient data processing and management and control of network devices. Moreover, the SDN network architecture is implemented in an open way. It can abstract the whole network, provide the user with standard application programming interfaces, and can provide customized network resources for upper layer applications to meet specific requirements.

As shown in FIG. 1(a), a traditional Globalstar network architecture utilizes a star network structure. User terminals cannot communicate with each other directly through satellite nodes. The communication from a user terminal must be relayed to the ground station through one-hop satellite node first, and then be relayed to another user terminal through one-hop satellite node. Such a two-hop process results in a larger time delay and inefficient management of the network.

Figure 1B:
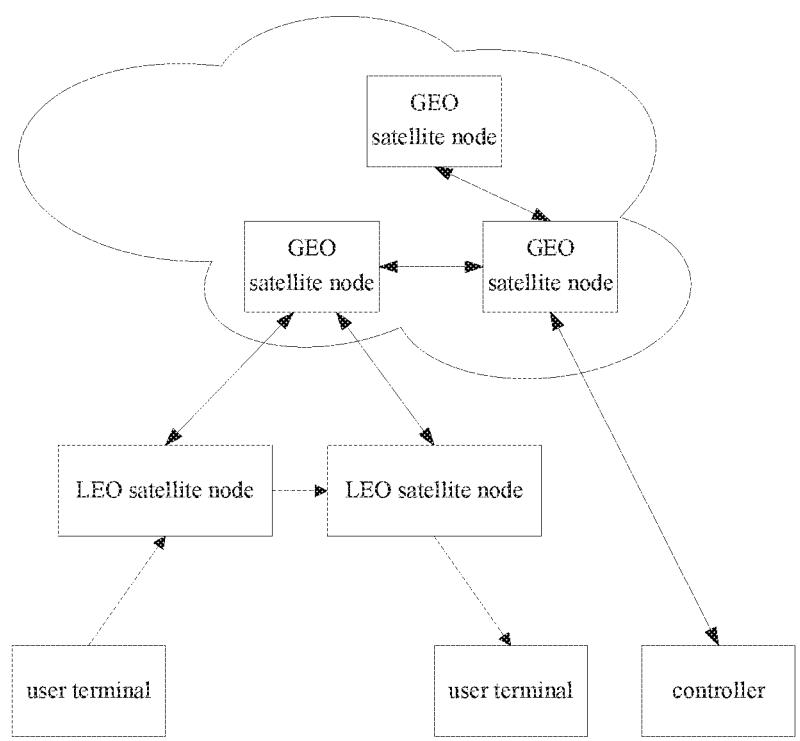
FIG. 1(b) is a schematic diagram showing the architecture of an SDN-based multi-layered satellite network in the prior art.

A solution to above problems of the traditional Globalstar network architecture is an SDN-based multi-layered satellite network architecture as shown in FIG. 1(b). The network architecture includes a data plane, a control plane and a management plane. The data plane includes user terminals and LEO satellite nodes distributed around the world, and the data plane runs related protocols for forwarding of data packets. The control plane includes at least three GEO satellite nodes. The control plane monitors status of the data plane, such as status of links and network traffic, etc., through a southbound interface. The management plane includes a network operation center and a network control center that are deployed on the ground. The control plane monitors and manages the LEO satellites nodes in the data plane, and acquires information of links of the network (e.g., connectivity of the links, bandwidth of the links, and time delay) and information of satellite nodes. The control plane sends status information of the LEO satellite nodes in the data plane to the management plane to obtain the topology of the entire network. The management plane provides functions for various applications, including routing calculation, network virtualization, security, resource utilization, and mobility management, etc. The management plane performs the routing calculation to generate a flow table entry, which is to be sent to the data plane, based on the topology information of the entire network provided by the control plane.

However, the number of the LEO satellites nodes included in the data plane may be up to more than 2,000, while the number of the GEO satellite nodes included in the control plane is only 3. With the expansion of the network, transmission of a large amount of information between the GEO satellite nodes and the LEO satellite nodes will cause network congestion during the management of the data plane by the control plane. The control plane may be not able to effectively and timely process data in the data plane. Such limitation of the GEO satellite nodes limits the scalability of the network.

Figure 2:
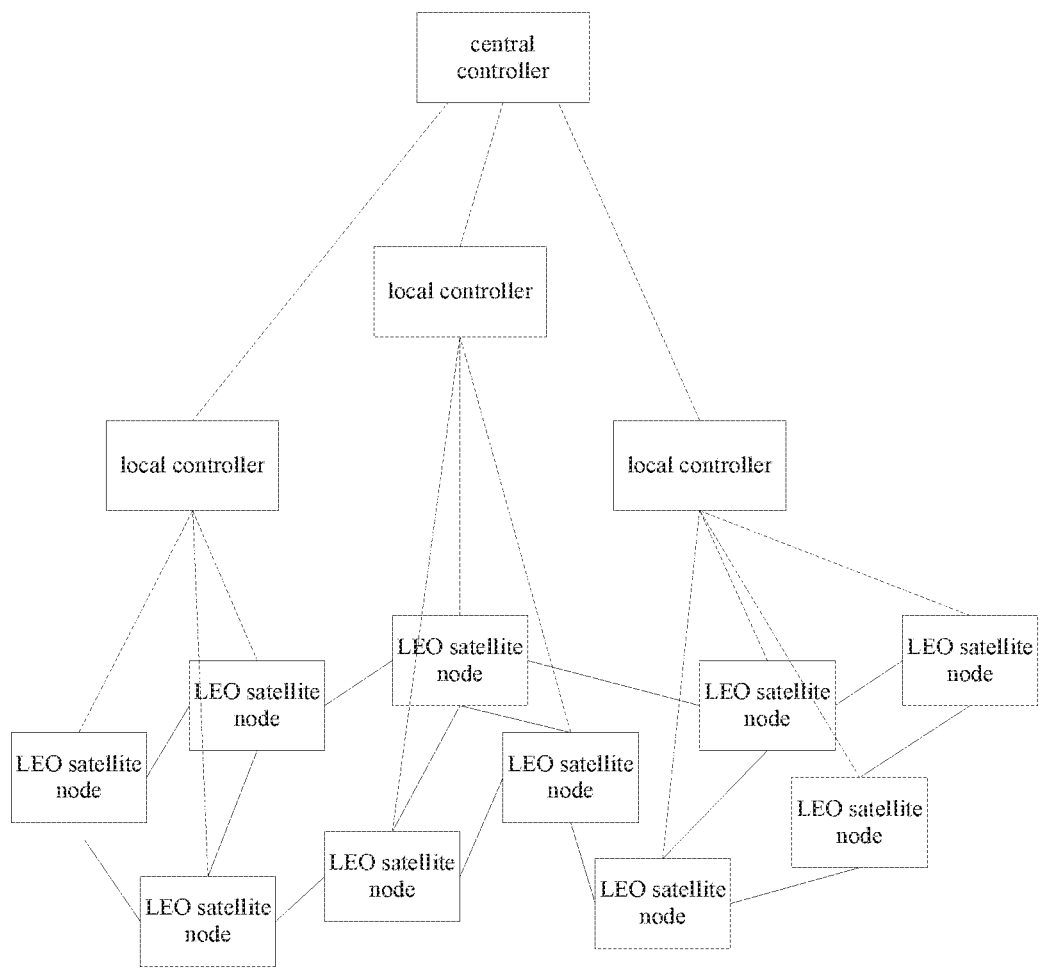
FIG. 2 is a schematic diagram showing the architecture of an SDN-based LEO satellite network provided by an embodiment of the present invention.

As shown in FIG. 2, a schematic diagram of the structure of an SDN-based LEO satellite network provided by an embodiment of the present invention is shown, which is an HTCA (Hierarchical Terrestrial Controllers Architecture) including a control plane and a data plane. The data plane includes a plurality of LEO satellite nodes and user terminals connecting to the LEO satellite nodes. A multi-layered satellite infrastructure is arranged between the LEO satellite nodes and the user terminals. The control plane may be deployed on the ground, and include a central controller and a plurality of local controllers. Each local controller monitors LEO satellite nodes in a subnet under the control of the local controller, and each of the LEO satellite nodes can be connected to the controller. A local controller of the control plane monitors the status information of the satellite network composed of LEO satellite nodes of the data plane, such as the monitoring of the link status, the network traffic, etc., through a southbound interface, and obtains the topology information of the satellite network based on the status information of the satellite network. The local controllers may communicate with each other and exchange network topology information with each other to synchronize the topology information of the network. The central controller is configured for managing the communication between the plurality of local controllers. The local controllers transmit information of user terminals of subnets to the central controller, and the central controller combine and store the information of the user terminals of the subnets.

In the network shown in FIG. 2, the data plane runs related protocols (such as OpenFlow protocol. LLDP (Link Layer Discovery Protocol), etc.) to implement forwarding of data messages. Such protocols performs a matching of header of a data message, including fields such as the IP (Internet Protocol) address, port number, multicast, user defined field, and the like. The data message is then forwarded based on the matching result.

The centralized management and control of the data plane are placed on the ground, and the LEO satellite nodes are monitored by a plurality of local controllers. Such an approach is more time efficient than traditional management of the data plane by the GEO satellite nodes, allowing for an improved scalability of the satellite network. Moreover, the distance between a local controller and an LEO satellite node is much smaller than the distance between a GEO satellite node and the LEO satellite node, and thus the time delay for data transmission and traffic loss during transmission will be much smaller.

Figure 3:
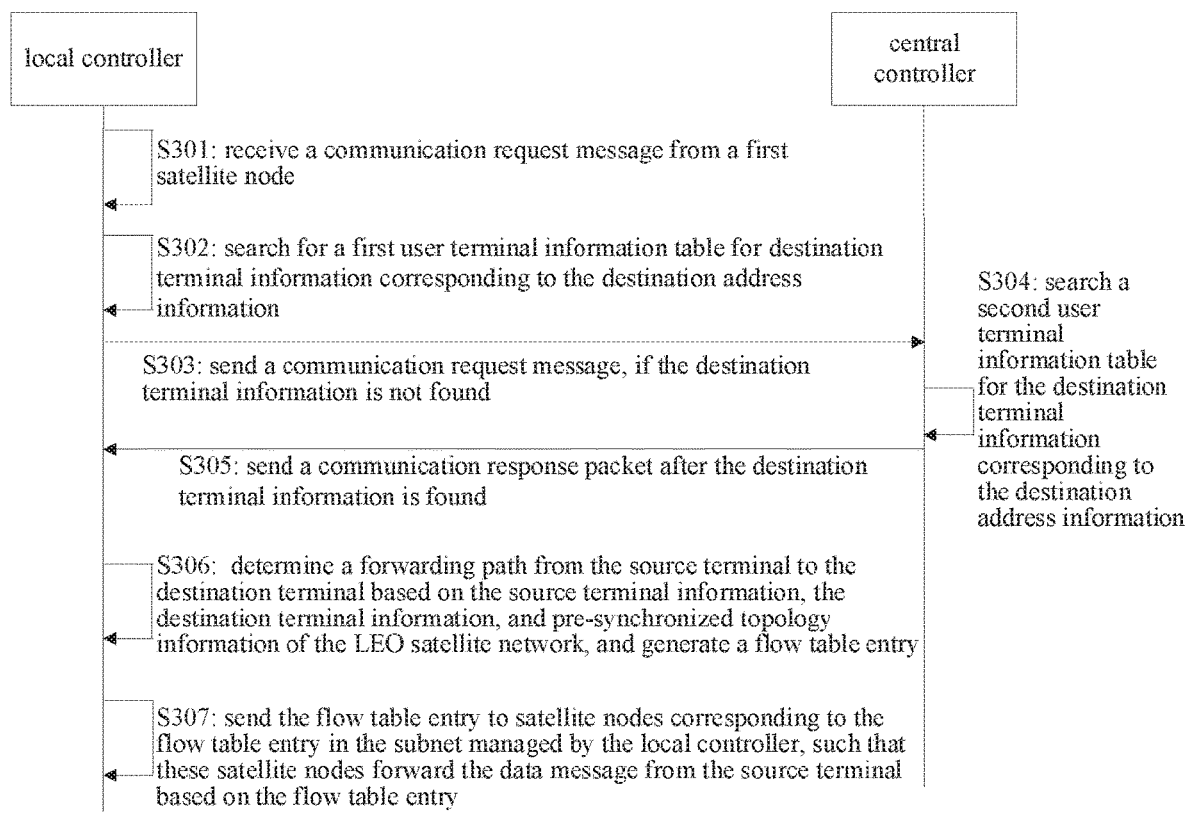
FIG. 3 shows a flow of the communication between a local controller and a central controller for implementing a routing method for an SDN-based LEO satellite network provided by an embodiment of the present invention.

The routing method for an SDN-based LEO network will be illustrated below in connection with the process of interaction between a local controller and a central controller. As shown in FIG. 3, the routing method may include the following operations.

At S301, a local controller receives a communication request message sent by a first satellite node.

The communication request message may contain source terminal information of a source terminal that requests communication and destination address information of a destination terminal with which the source terminal requests communication. The first satellite node is a satellite node to which the source terminal is connected.

The first satellite node is a satellite node in a subnet managed by the local controller, and the first satellite node is connected with the source terminal requesting the communication with the destination terminal. The local controller manages some of the LEO satellite nodes in the LEO satellite network, which are usually several LEO satellite nodes closest to the local controller. When the source terminal has is to send a data message to the destination terminal, the source terminal sends a communication request message to an LEO satellite node connected with the source terminal. The LEO satellite node forwards the communication request message to the local controller for route calculation. The communication request message contains at least source terminal information of the source terminal and destination address information of the destination terminal to facilitate the route calculation on the local controller. The source terminal information may include, e.g., the IP address and the MAC (Media Access Control) address of the source terminal, and the IP address and port number of the first satellite node connected with the source terminal. The destination address information may include, e.g., the IP address and the MAC address of the destination terminal.

At S302, the local controller searches a first user terminal information table for destination terminal information corresponding to the destination address information.

The first user terminal information table is stored in the local controller, and contains user terminal information of user terminals connected to LEO satellite nodes in the subnet managed by the local controller.

After receiving the communication request message forwarded by the first satellite node, the local controller identifies the destination address information from the communication request message. The local controller maintains the user terminal information table thereon, which records user terminal information of user terminals connected to LEO satellite nodes in the subnet managed by the local controller, including the IP address and MAC address of each of the user terminals, and the IP address and port number of each of the satellite nodes. The local controller may search the first user terminal information table maintained thereon for the destination terminal information, including the IP address and the port number of the satellite node accessed by the destination terminal, based on the destination address information. If the destination terminal information is found in the first user terminal information table, it means that the source terminal and the destination terminal are in the same subnet, and the data message may be directly transmitted within the subnet. If the destination terminal information is not found, it means that the source terminal and the destination terminal are in different subnets, and the data message will be transmitted across subnets.

The first user terminal information table may contain user terminal information of each user terminal in the subnet managed by the local controller, and the user terminal information may be recorded through a network access authentication when the user terminal accesses the LEO satellite node. The network access authentication may be any known technique, and the detailed descriptions thereof will be omitted here.

At S303, if the destination terminal information is not found in the first user terminal information table, the local controller sends the communication request message to the central controller.

If the destination terminal information is not found in the first user terminal information table, it means that the source terminal and the destination terminal are not in the same subnet, and the data message has to be transmitted across subnets. The local controller does not know which subnet the destination terminal is located, while the central controller records terminal information of user terminals in all subnets. Therefore, the local controller sends the communication request message to the central controller, such that the central controller searches for the terminal information of the destination terminal.

Optionally, after S302, the method provided by the embodiment of the present invention may further include the following operations:

if the destination terminal information is found in the first user terminal information table, determining a forwarding path from the source terminal to the destination terminal based on the source terminal information, the destination terminal information and pre-obtained topology information of the subnet, and generating a flow table entry; and sending the flow table entry to satellite nodes corresponding to the flow table entry in the subnet, such that each of the satellite nodes forwards data messages from the source terminal based on the flow table entry.

If the destination terminal information is found in the first user terminal information table, it means that the source terminal and the destination terminal are in the same subnet, and the data message is transmitted in the subnet. The local controller may obtain in advance, by sending a probe message, topology information of the subnet managed by the local controller, including information on LEO satellite nodes in the subnet, the distance between every two satellite nodes, network communication situation, etc. The local controller may determine the forwarding path from the source terminal to the destination terminal based on the topology information of the subnet. The forwarding path may be determined by using for example a shortest path first algorithm or transmission quality optimal path planning. After the forwarding path is determined, a flow table entry may be generated correspondingly, and the flow table entry contains node information of each of LEO satellite nodes on the forwarding path, such as the name, the IP address, the port number of the LEO satellite node, etc. The flow table entry may be sent to each of the LEO satellite nodes in the flow table entry, so that these satellite nodes may transmit data messages from the source terminal based on the flow table entry.

At S304, the central controller searches a second user terminal information table for the destination terminal information corresponding to the destination address information.

The second user terminal information table is stored in the central controller, and records user terminal information of the user terminals connected to all satellite nodes in the LEO satellite network.

After receiving the communication request message forwarded by the local controller, the central controller identifies the destination address information in the communication request message. The central controller maintains a user terminal information table thereon. The central controller may receive and record user terminal information of the user terminals connected to the satellite nodes in the subnet managed by the local controllers, to obtain the second user terminal information table. The second user terminal information table contains user terminal information of the user terminals connected to all the satellite nodes in the LEO satellite network, including the IP addresses and MAC addresses of each of the user terminals, and the IP address and port number of each of the satellite nodes. The central controller may search the second user terminal information table maintained thereon for the destination terminal information including the IP address and the port number of the satellite node accessed by the destination terminal, based on the destination address information.

The second user terminal information table in the central controller may contain user terminal information of all user terminals in the LEO satellite network, and the user terminal information may be recorded through a network access authentication when each user terminal accesses the LEO satellite nodes. The network access authentication may be any known technique, and the detailed descriptions thereof will be omitted here.

At S305, the central controller sends a communication response message to the local controllers after the destination terminal information is found.

The communication response message contains the destination terminal information.

After the destination terminal information is found, the central controller thus obtains the information of the LEO satellite node accessed by the destination terminal, such as the IP address, the accessed port number of the satellite node. The central controller may encapsulate the destination terminal information in the communication response message, and send the communication response message to each of the local controllers, to inform each local controller of the terminal information of the destination terminal with which the source terminal requests communication, so that each of the local terminals may calculate a forwarding path based on the source terminal information and the destination terminal information.

At S306, the local controller determines a forwarding path from the source terminal to the destination terminal based on the source terminal information, the destination terminal information, and pre-synchronized topology information of the LEO satellite network, and generates a flow table entry.

The local controller may pre-synchronize topology information of the entire LEO satellite network from the central controller. The topology information may include the distribution of the LEO satellite nodes in the entire LEO satellite network, the distance between every two LEO satellite nodes, the forwarding path between every two LEO satellite nodes, etc. The local controller may determine the forwarding path from the source terminal to the destination terminal from the topology information of the LEO satellite network based on the source terminal information and the destination terminal information. Specifically, the forwarding path may be directly selected from the forwarding path from the LEO satellite node accessed by the source terminal and the LEO satellite node accessed by the destination terminal, or may be calculated from the distance between every two LEO satellite nodes. The forwarding path means a path including LEO satellite nodes for transmitting the data message from the satellite node connected with the source terminal to the LEO satellite node connected to the destination terminal. Correspondingly, the generated flow table entry may contain information of the source terminal, information of the destination terminal, and information of each of the LEO satellite nodes on the path.

Optionally, the synchronization of the topology information of the LEO satellite network may be performed as follows.

At step 1, the local controller sends a probe message to a second satellite node in the subnet, such that the second satellite node sends the probe message to each of the neighbor satellite nodes of the second satellite node in the subnet, wherein the second satellite node is any of the satellite nodes in the subnet.

At step 2, the local controller receives a probe response message sent by each neighbor satellite node of the second satellite node in the subnet.

At step 3, the local controller obtains topology information of the subnet based on the probe response messages.

At step 4, the local controller sends the topology information of the subnet to the central controller.

After receiving from each of the local controllers the topology information of a subnet managed by this local controller, the central controller determines a forwarding path between every two satellite nodes in the LEO satellite network based on the topology information of each of the subnets, generates a flow table entry corresponding to each of the forwarding paths, and sends the flow table entries to each of the local controllers.

At step 5, the local controller receives the flow table entries sent by the central controller.

At step 6, the local controller performs flow table matching on each of the flow table entries to synchronize the topology information of the LEO satellite network.

Figure 4:
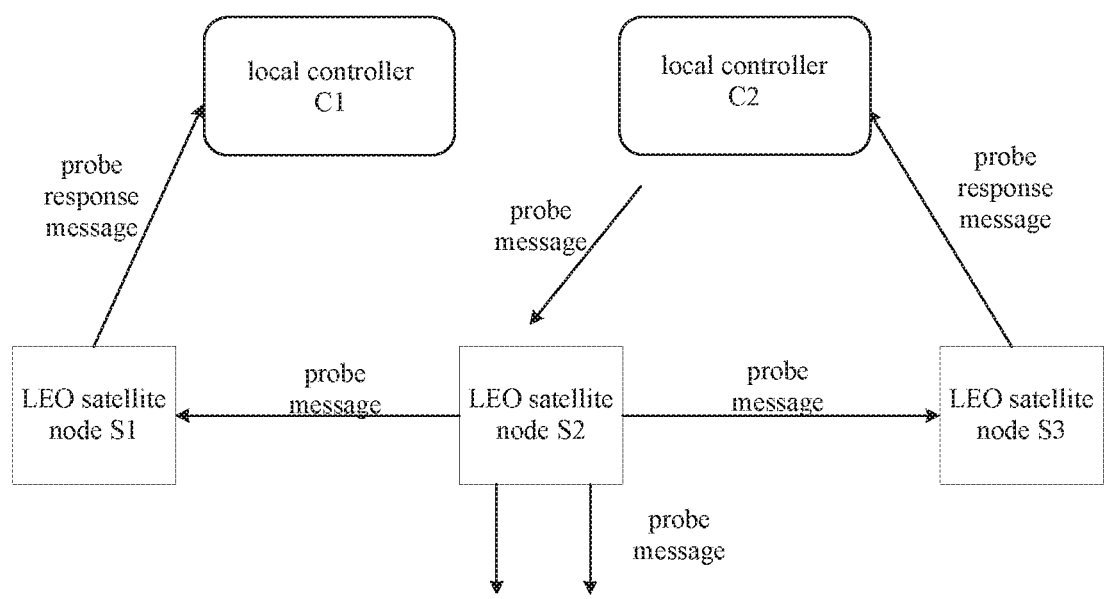
FIG. 4 shows a flow of obtaining topology information of a subnet provided by an embodiment of the present invention.

The topology information of the LEO satellite network may include accessibility of the LEO satellite nodes and the topology information of each of the subnets. The topology information of a subnet includes for example information of the LEO satellite nodes, and the connectivity, bandwidth and time delay of the inter-satellite links, etc. The local controller sends periodically a probe message to the LEO satellite nodes managed by the local controller, obtains information of the LEO satellite nodes based on the returned probe response messages. The local controller thus can obtain and update the topology information of the subnet while monitoring working states of the satellite nodes. The probe message and the probe response message may be an LLDP message. As shown in FIG. 4, a local controller C1 and a local controller C2 represent local controllers for two different subsets, an LEO satellite node S1 belongs to a subnet 1, and an LEO satellite node S2 and an LEO satellite node S3 belong to a subnet 2. The local controller C2 sends a probe message to the LEO satellite node S2. The LEO satellite node S2 sends the probe message to its four neighbor nodes respectively. After receiving the probe message from the LEO satellite node S2, the LEO satellite node S1 and the LEO satellite node S3 each sends a probe response message to the local controller C1 and the local controller C2. After receiving the probe response message, the local controllers obtain information of the link between the LEO satellite node S1 and the LEO satellite node S2 and information of the link between the LEO satellite node S2 and the LEO satellite node S3. The local controller C1 and the local controller C2 may obtain information of the LEO satellite nodes connected thereto and topology information of the subnets from the probe response message.

In the distributed control center architecture, in order to ensure that a plurality of local controllers can work together, it is necessary to synchronize the topology information of the entire LEO satellite network, and each of the local controllers sends topology information of its subnet and information of its LEO satellite nodes to the central controller. The central controller calculates forwarding paths based on the topology information of the subnets by using for example a shortest path algorithm or transmission quality optimal path planning. The central controller generates a flow table entry corresponding to each forwarding path, and sends the generated flow table entries to each of the local controllers. After receiving the flow table entries, each local controller may synchronize the topology information of the entire LEO satellite network by matching the flow table entries.

At S307, the local controller sends the flow table entry to each of satellite nodes corresponding to the flow table entry in the subnet that the local controller managed, so that each of the satellite nodes in the subnet forwards data messages from the source terminal based on the flow table entry.

After receiving a flow table entry, the local controller may send the flow table entry to each of the LEO satellite nodes on the forwarding path from the source terminal to the destination terminal recorded in the flow table entry. After receiving the flow table entry, each LEO satellite nodes can determine a next-hop LEO satellite node or terminal for a data message from the source terminal. In this way, the data message can be transmitted from the source terminal to the destination terminal.

In the embodiments of the present invention, the LEO satellite network includes a data plane and a control plane. The data plane includes a plurality of LEO satellite nodes and user terminals connecting to the LEO satellite nodes. The control plane includes a central controller and a plurality of local controllers. A local controller receives a communication request message sent by a first satellite node in the data plane, and searches a first user terminal table for destination terminal information corresponding to the destination address information contained in the communication request message. If the destination terminal information is not found in the first user terminal table, the local controller sends the communication request message to the central controller. The central controller searches a second user terminal table for the destination terminal information. The local controller receives the destination terminal information sent by the central controller, determines a forwarding path from the source terminal to the destination terminal based on the source terminal information, the destination terminal information and pre-synchronized topology information of the LEO satellite network and generates a flow table entry. The local controller sends the flow table entry to satellite nodes corresponding to the flow table entry in the subnet managed by the local controller, such that the satellite nodes may forward data messages sent by the source terminal based on the flow table entry. The control plane may be located on the earth, and thus the centralized management and control of the data plane are placed on the earth. A local controllers monitors LEO satellite nodes in a subnet or subnets of the local controller. The distance between a local controller and a LEO satellite node is much smaller than the distance between a GEO satellite node and the LEO satellite node, and thus the time delay and the traffic loss of communication are reduced.

Figure 5:
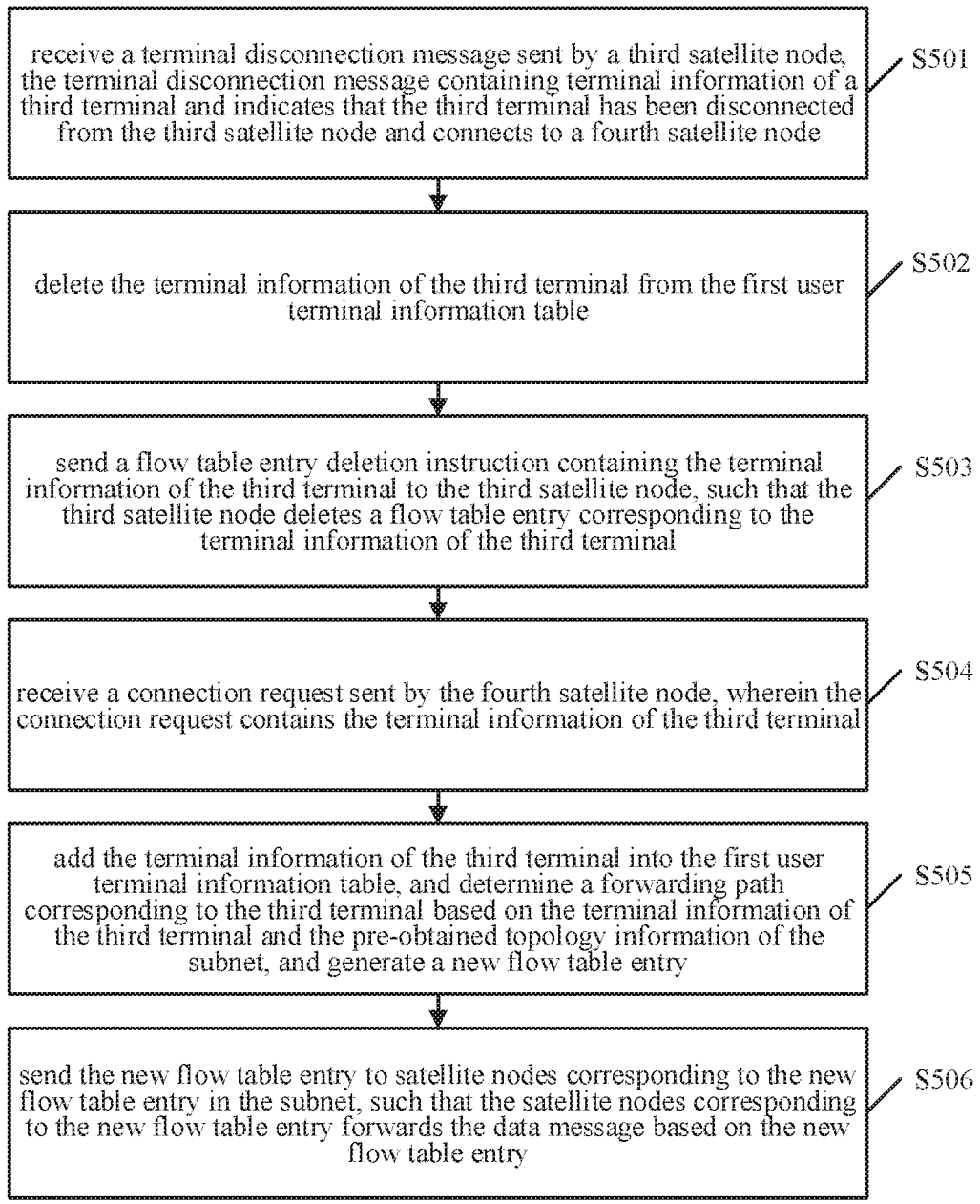
FIG. 5 is a flowchart of communication for a user terminal disconnecting from a satellite node and connecting to another satellite node provided by an embodiment of the present invention.

The LEO satellite nodes provide the user terminals with a direct access to the network. However, since the LEO satellite nodes moves with respect to the earth in a high speed, the user terminals have to frequently change to connect to different satellite nodes during communication. In order to cope with such connection changes, if the source terminal and the destination terminal are in the same subset, as shown in FIG. 5, the change from connecting to a satellite node to connecting to another satellite node may be implemented on a local controller described as follows.

At S501, a terminal disconnection message sent by a third satellite node is received; wherein the terminal disconnection message contains terminal information of a third terminal and indicates that the third terminal has disconnected from the third satellite node and connects to a fourth satellite node.

The third terminal may be the source terminal that sends the data message, or may be the destination terminal that receives the data message. The third terminal was connected to the third satellite node, and will change to connect to the fourth satellite node during the movement of the LEO satellite nodes. When the change occurs, the third terminal is disconnected from the third satellite node. At this time, the third satellite node generates a terminal disconnection message, which contains the terminal information of the third terminal. The third satellite node sends the terminal disconnection message to the local controller, to notify the local controller that the third terminal has been disconnected from the third satellite node.

At S502, the terminal information of the third terminal is deleted from the first user terminal information table.

After receiving the terminal disconnection message, the local controller determines that the third terminal has been disconnected from the third satellite node, and that the third terminal no longer belongs to the subnet managed by the local controller. Therefore, the local controller deletes the terminal information of the third terminal from the first user terminal information table.

At S503, a flow table entry deletion instruction containing the terminal information of the third terminal is sent to the third satellite node, such that the third satellite node deletes a flow table entry corresponding to the terminal information of the third terminal.

After the local controller determines that the third terminal no longer belongs to the subnet managed by it, the local controller sends a flow table entry deletion instruction to the third satellite node. The third satellite node deletes the flow table entry corresponding to the terminal information of the third terminal, and will not receive data messages from and send data messages to the third terminal.

At S504, a connection request sent by the fourth satellite node is received; wherein the connection request contains the terminal information of the third terminal.

When the fourth satellite node moves into the subnet of the local controller, the third terminal will establish a connection with the fourth satellite node. At this time, the third terminal initiates a connection request to the fourth satellite node, and the fourth satellite node forwards the connection request to the local controller after receiving the connection request.

At S505, the terminal information of the third terminal is added into the first user terminal information table, and a forwarding path corresponding to the third terminal is determined based on the terminal information of the third terminal and pre-obtained topology information of the subnet, and a new flow table entry is then generated.

After receiving the connection request, the local controller identifies the terminal information of the third terminal in the connection request, adds the terminal information of the third terminal into the first user terminal information table again, and establishes a new forwarding path for the third terminal and generates a new flow table entry.

At S506, the new flow table entry is sent to satellite nodes corresponding to the new flow table entry in the subnet, such that the satellite nodes corresponding to the new flow table entry forward data messages based on the new flow table entry.

After the new flow table entry is generated, the new flow table entry is sent to each of the satellite nodes, such that each of the satellite nodes forwards the data messages based on the flow table entry.

Figure 6:
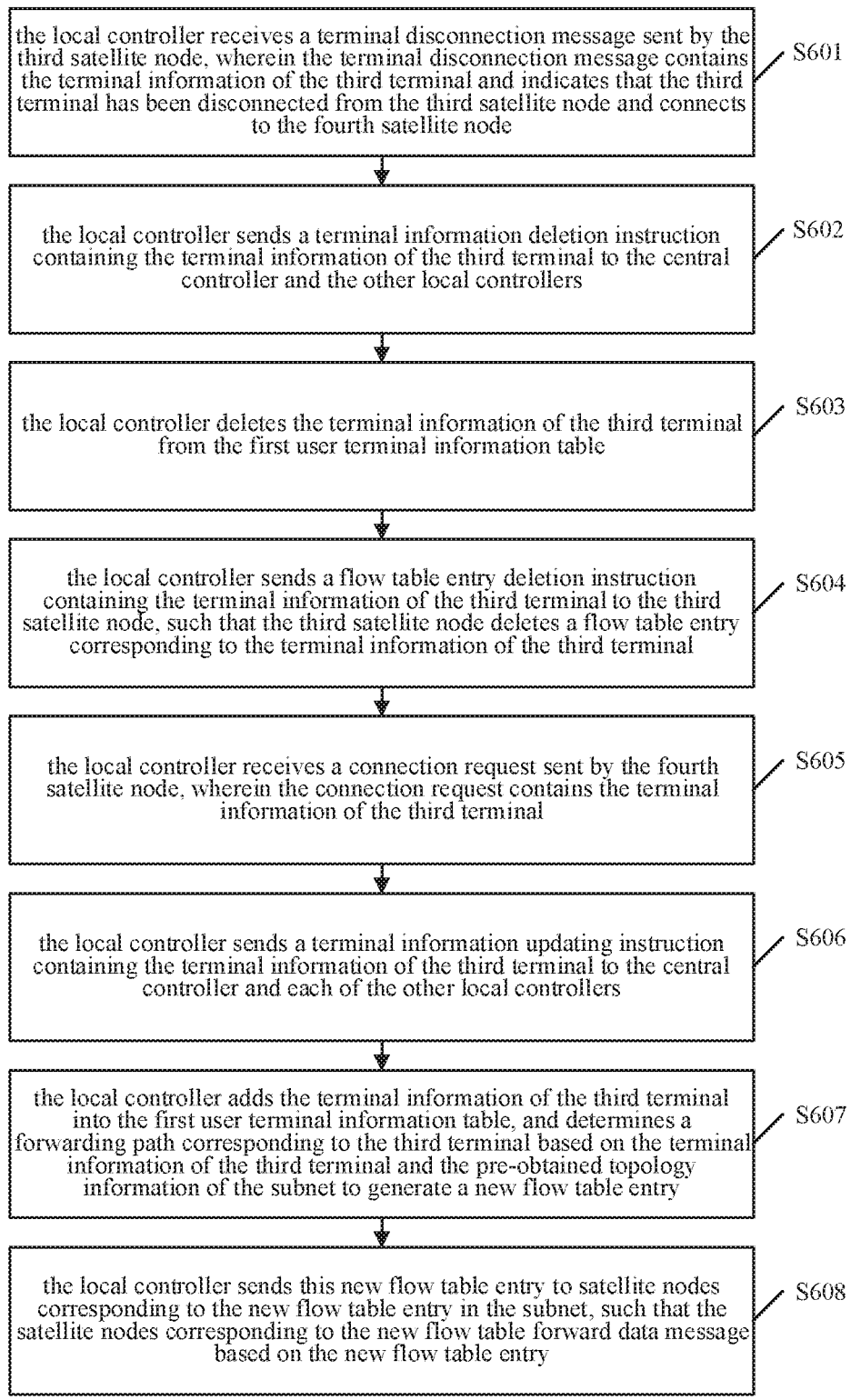
FIG. 6 is another flowchart of communication for a user terminal disconnecting from a satellite node and connecting to another satellite node provided by an embodiment of the present invention.

If the source terminal and the destination terminal are in different subnets, as shown in FIG. 6, the change from connecting to a satellite node to connecting to another satellite node may include the following operations.

At S601, the local controller receives a terminal disconnection message sent by the third satellite node, wherein the terminal disconnection message contains the terminal information of the third terminal and indicates that the third terminal has been disconnected from the third satellite node and connects to the fourth satellite node.

At S602, the local controller sends a terminal information deletion instruction containing the terminal information of the third terminal to the central controller and the other local controllers.

After receiving the terminal information deletion instruction sent by the local controller, the central controller and each of the other local controllers delete the terminal information of the third terminal from their respective user terminal information tables.

At S603, the local controller deletes the terminal information of the third terminal from the first user terminal information table.

At S604, the local controller sends a flow table entry deletion instruction containing the terminal information of the third terminal to the third satellite node, such that the third satellite node deletes a flow table entry corresponding to the terminal information of the third terminal.

At S605, the local controller receives a connection request sent by the fourth satellite node, wherein the connection request contains the terminal information of the third terminal.

At S606, the local controller sends a terminal information updating instruction containing the terminal information of the third terminal to the central controller and each of the other local controllers.

After receiving the terminal information updating instruction sent by the local controller, the central controller and each of the other local controllers may add the terminal information of the third terminal into their respective user terminal information tables.

At S607, the local controller adds the terminal information of the third terminal into the first user terminal information table, and determines a forwarding path corresponding to the third terminal based on the terminal information of the third terminal and the pre-obtained topology information of the subnet, and generates a new flow table entry.

At S608, the local controller sends this new flow table entry to satellite nodes corresponding to the new flow table entry in the subnet, such that the satellite nodes corresponding to the new flow table forward data message based on the new flow table entry.

Unlike the case where the source terminal and the destination terminal in the same subnet, if the source terminal and the destination terminal are in different subnets, each of the central controller and the local controllers needs to delete the terminal information of the third terminal in the their user terminal information table when the third terminal is disconnected from the third satellite node, and adds the terminal information of the third terminal into the local user terminal information table after the third terminal establishes a connection with the fourth satellite node.

The embodiments of the present invention handles the cases where the user terminal changes from connecting to a satellite to connecting to another satellite node, guarantees the appreciate forwarding of data messages when such a change occurs.

For better understanding, specific details of the method provided by the embodiments of the present invention will be set forth below by way of a specific example, illustrating the interaction between the components in the satellite network.

Figure 7:
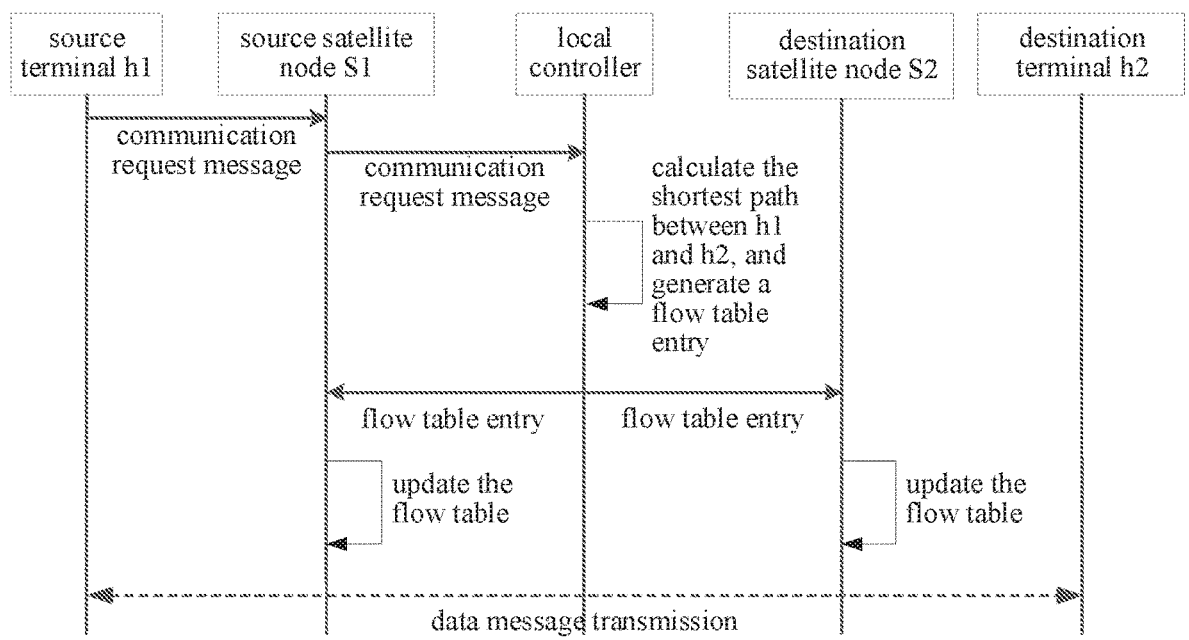
FIG. 7 is a diagram showing the communication by using satellites under the same local controller provided by an embodiment of the present invention.

As shown in FIG. 7, a schematic diagram of the communication between satellites under the same controller provided by an embodiment of the present invention is shown. A source terminal h1 and a destination terminal h2 respectively connect to satellite nodes that are managed by the same local controller. The communication mainly includes the following operations.

The source terminal h1 requests to transmit a data message to the destination terminal h2. The source terminal h1 sends a communication request message (for example, an ARP (Address Resolution Protocol) request message) to a source satellite node S1 to which the source terminal connects.

After receiving the communication request message, the source satellite node S1 directly forwards the communication request message to a local controller.

The local controller searches a first user terminal information table. When information of the destination terminal h2 is found, the local controller calculates the shortest path between the source terminal h1 and the destination terminal h2 based on the terminal information of the source terminal h1, the terminal information of the destination terminal h2, and the topology information of the subnet, and generates a flow table entry. The local controller then sends the flow table entry to the source satellite node S1 and a destination satellite node S2 to which the destination terminal connects.

After receiving the flow table entry, the source satellite node S1 and the destination satellite node S2 update their flow table with the flow table entry, and forward the data message from the source terminal h1 to the destination terminal h2 based on the flow table entry.

Figure 8:
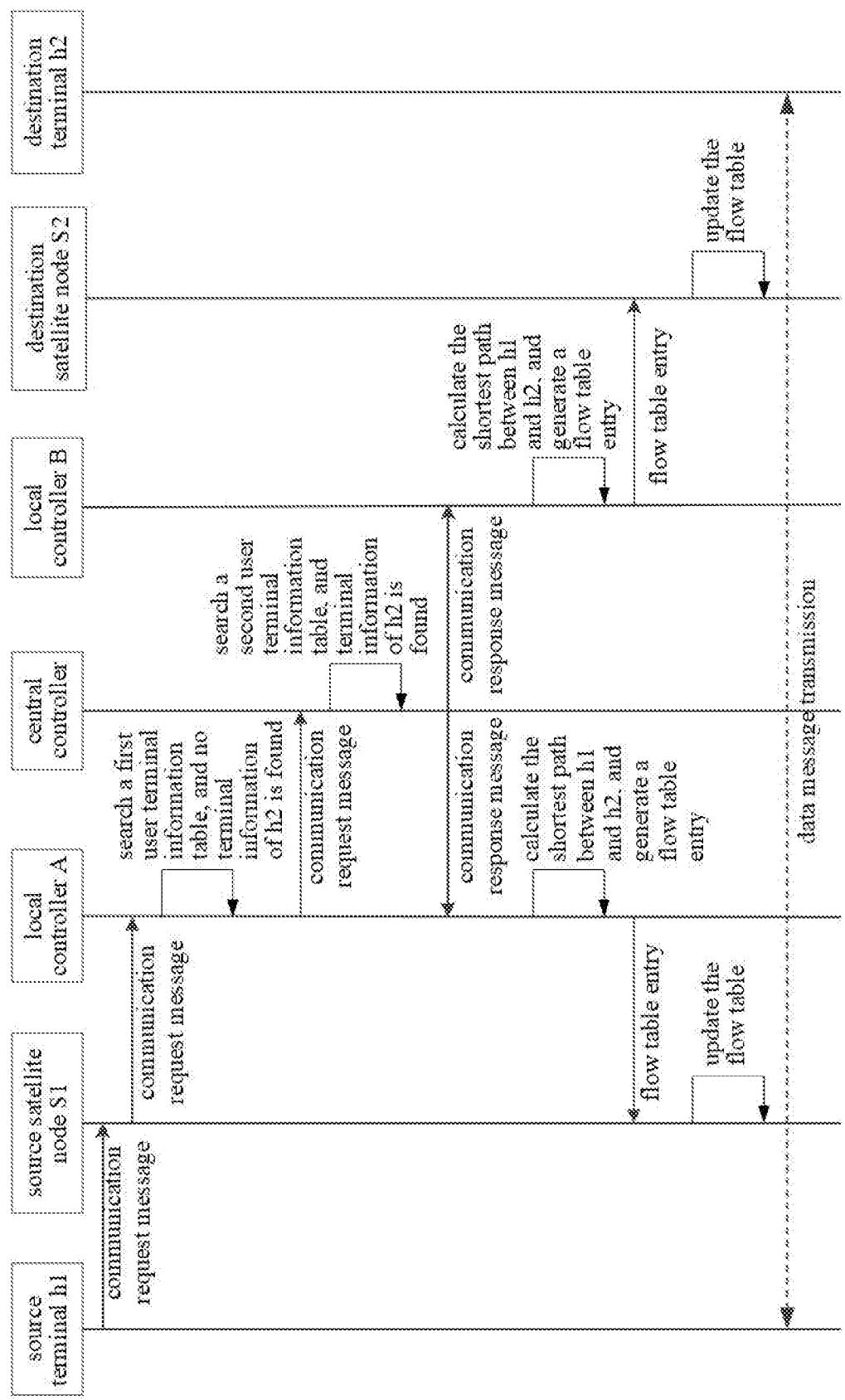
FIG. 8 is a diagram showing the communication by using satellites under different local controllers provided by an embodiment of the present invention.

As shown in FIG. 8, a schematic diagram of a communication between satellites under different controllers provided by an embodiment of the present invention is shown. A source terminal h1 and a destination terminal h2 connect to satellite nodes that are managed by two different local controllers. The source satellite node S1, to which the source terminal connects, is managed by a controller A and the destination satellite node S2, to which the destination terminal connects, is managed by a controller B. The communication mainly includes the following operations.

The source terminal h1 requests to transmit a data message to the destination terminal h2. The source terminal h1 first sends a communication request message to the source satellite node S1.

After receiving the communication request message, the source satellite node S1 directly forwards the communication request message to the local controller A.

The local controller A searches its first user terminal information table. If the terminal information of the destination terminal h2 is not found, the local controller A forwards the communication request message to the central controller.

The central controller searches the second user terminal information table, and sends the terminal information of the destination terminal h2 to the local controller A and the local controller B after the terminal information of the destination terminal h2 is found. The local controller A and the local controller B calculate the shortest path between the source terminal h1 and the destination terminal h2 based on the terminal information of the source terminal h1, the terminal information of the destination terminal h2, and the topology information of the entire satellite network, and generate a flow table entry respectively. The local controller A and the local controller B send the flow table entries to the source satellite node S1 and the destination satellite node S2 respectively.

After receiving the flow table entries, the source satellite node S1 and the destination satellite node S2 update their flow tables with the flow table entries, and forward the data message from the source terminal h1 to the destination terminal h2 based on the flow table.

Figure 9:
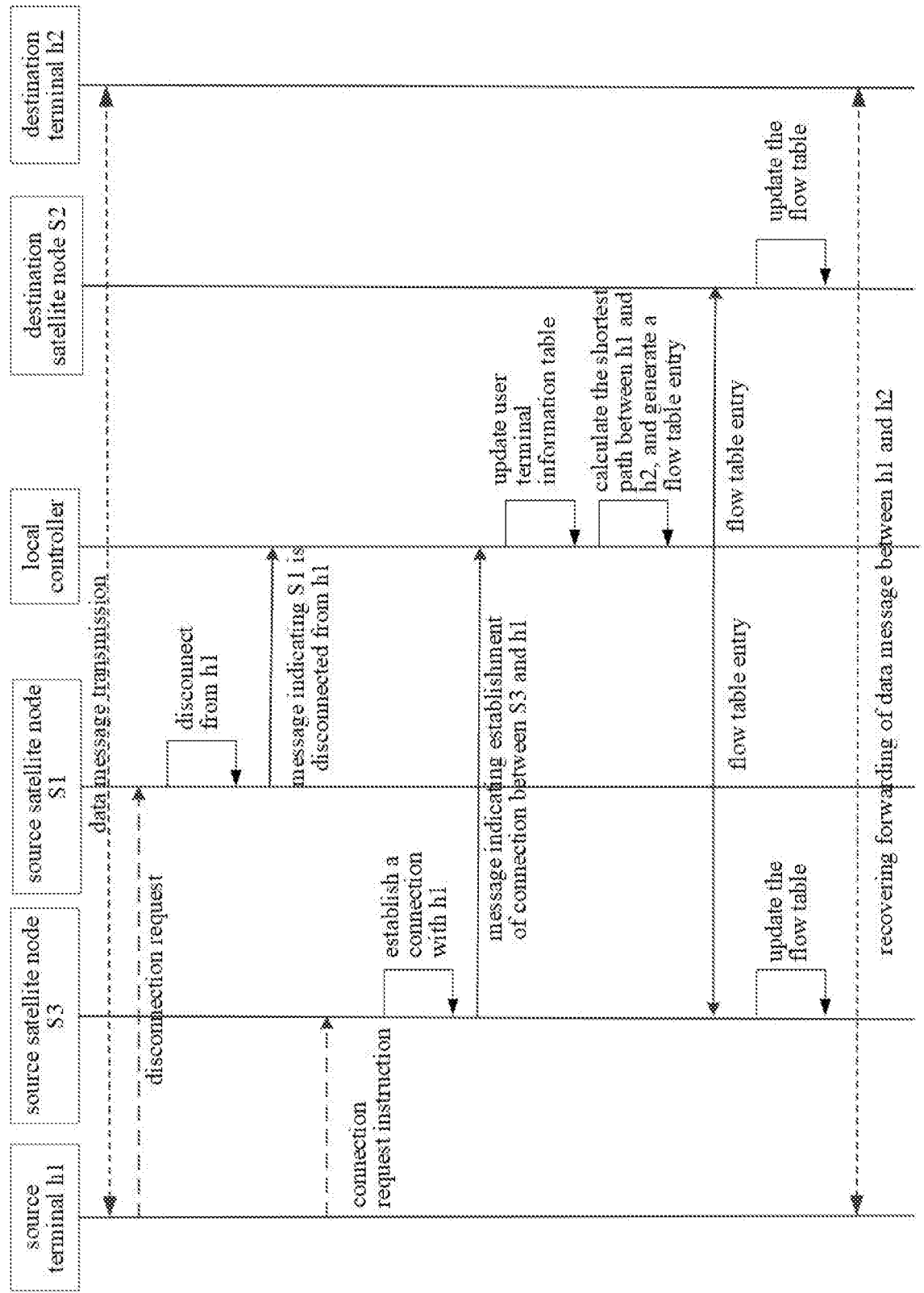
FIG. 9 is a diagram showing the communication for disconnecting from a satellite node under a controller and connecting to another satellite under the same controller provided by an embodiment of the present invention.

As shown in FIG. 9, FIG. 9 is a schematic diagram of the change from connection with a satellite node to connection with another satellite node under the same controller provided by an embodiment of the present invention. During the communication between user terminals, the satellite nodes covering the user terminals may change every a few minutes due to periodic movement of the satellites. When such a change occurs, the connectivity of the communication link should be maintained. Satellite nodes to which the source terminal h1 and the destination terminal h2 connect are managed by the same local controller. During the communication between the source terminal h1 and the destination terminal h2, the source terminal h1 changes to connecting to another satellite node. The such changing process may include the following operations.

The user terminals detect signals from the satellite nodes. When a signal is lower than a certain value, the source terminal h1 initiates the satellite changing, and sends a disconnection request to the source satellite node S1 to which the source terminal h1 connected.

The source satellite node S1 is disconnected from the source terminal h1, and reports a message to the local controller indicating that the source satellite node S1 has been disconnected from the source terminal h1.

After receiving the message indicating that the source satellite node has been disconnected from the source terminal, the local controller triggers a satellite changing control and updates the user terminal information table. The local controller A sends an instruction for deleting a flow table entry to the source satellite node S1 and the destination satellite node S2.

The source terminal h1 sends a connection request instruction to another source satellite node S3 to which the source terminal is to be connected, to establish a connection with the other source satellite node S3. The source terminal h1 then sends a message indicating the establishment of the connection between the other source satellite node S3 and the source terminal h1 to the local controller.

The local controller updates the user terminal information table.

The local controller calculates the shortest path between the source terminal h1 and the destination terminal h2 based on the topology information, and generates a flow table entry. The local controller encapsulates the flow table entry and sends it to the satellite node S3 and the satellite node S2.

After receiving the flow table entry, the satellite node S3 and the satellite node S2 update their flow table with the flow table entry respectively. The data message between the source terminal h1 and the destination terminal h2 is forwarded based on the flow table entry, and packet forwarding between the source terminal h1 and the destination terminal h2 is recovered.

Figure 10:
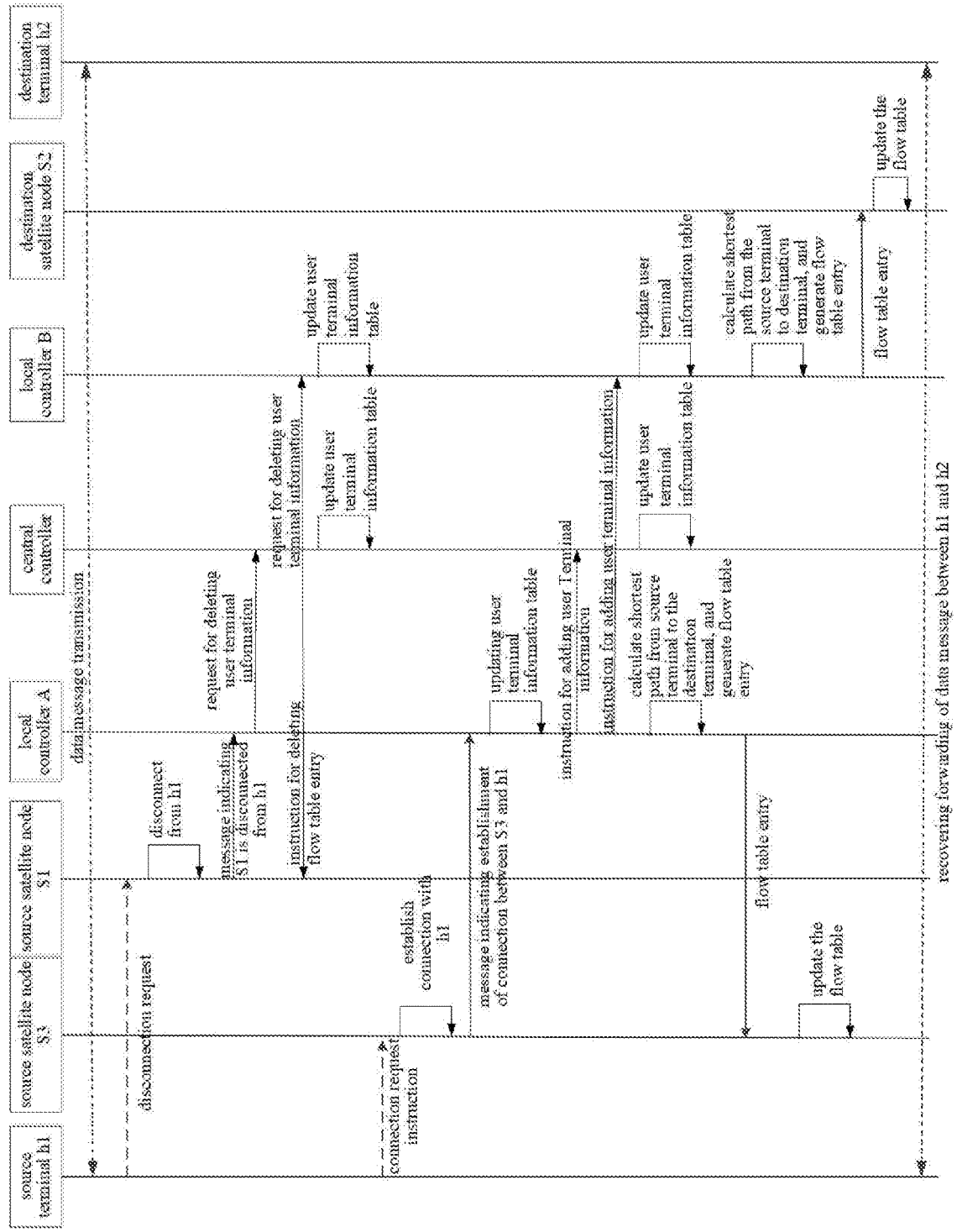
FIG. 10 is a diagram showing the communication for disconnecting from a satellite node under a controller and connecting to another satellite under a different controller provided by an embodiment of the present invention.

As shown in FIG. 10, FIG. 10 is a schematic diagram of the change from connection with a satellite node to connection with another satellite node under different controllers provided by an embodiment of the present invention. A source terminal h1 and a destination terminal h2 are connected to satellite nodes respectively that are managed by two different local controllers. The satellite node S1 and the satellite node S3 are managed by a local controller A, and the satellite node S2 is managed by a local controller B. During the communication between the source terminal h1 and the destination terminal 112, the source terminal h1 changes to connecting to another satellite node. The process may include the following steps.

The user terminals detect signals from the satellites. When a signal is lower than a certain value, the source terminal h1 initiates the satellite changing, and sends a disconnection request to the source satellite node S1 before to which the source terminal h1 connected.

The source satellite node S1 is disconnected from the source node h1, and reports a message to the local controller A indicating that the source satellite node S1 has been disconnected from the source terminal h1.

After receiving the message, the local controller A triggers a satellite switching control, updates the user terminal information table. The local controller A sends a request for deleting the user information to the central controller and the local controller B respectively, and sends an instruction for deleting a flow table entry to the source satellite node S1.

After receiving the request for deleting the user information, the central controller and the local controller B update their respective user terminal information table. After receiving the instruction for deleting the flow table entry, the satellite node S1 deletes the corresponding flow table entry.

The local controller B sends an instruction for deleting a flow table entry to the destination satellite node S2. The destination satellite node S2 deletes the corresponding flow table entry.

The source terminal h1 sends a connection request instruction to another source satellite node S3 to which the source terminal is to be connected, to establish a connection with the satellite node S3. The source terminal then sends a message indicating the establishment of the connection between the other source satellite node S3 and the source terminal h1 to the local controller A.

The local controller A updates the user terminal information table, sends an instruction for adding user terminal information to the central controller and the local controller B respectively. The local controller A calculates the shortest path from the source terminal to the destination terminal, generates a flow table entry, and sends the flow table entry to the satellite node S3.

After receiving the instruction, the central controller and the local controller B update their respective user terminal information tables.

The local controller B calculates the shrillest path from the source terminal to the destination terminal, generates a flow table entry, and sends the flow table entry to the destination satellite node S2.

After receiving the flow table entries, the satellite node S3 and the satellite node S2 update their flow table with the flow table entries respectively. The data message between the source terminal h1 and the destination terminal h2 is forwarded based on the flow table entry. The forwarding of the data message between the source terminal h1 and the destination terminal h2 is recovered.

Figure 11:
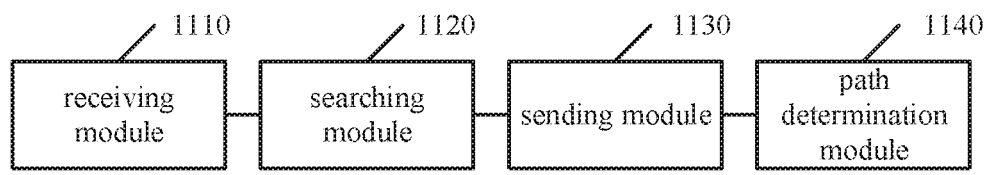
FIG. 11 is a diagram showing the structure of a routing apparatus for an SDN-based LEO satellite network which is applicable to a local controller provided by an embodiment of the present invention.

Corresponding to the above method embodiments, an embodiment of the present invention further provides a routing apparatus for art SDN-based LEO satellite network, which is applicable to a local controller in a control plane of an SDN-based LEO satellite network shown in FIG. 2. As shown in FIG. 11, the apparatus includes a receiving module 1110, a searching module 1120, a sending module 1130, and a path determination module 1140.

The receiving module 1110 is configured for receiving a communication request message sent by a first satellite node, wherein the communication request message contains source terminal information of a source terminal that requests communication and destination address information of a destination terminal with which the source terminal requests communication, and the first satellite node is a satellite node to which the source terminal is connected.

The searching module 1120 is configured for searching a first user terminal information table for destination terminal information corresponding to the destination address information, wherein the first user terminal information table is stored in the local controller and contains terminal information of user terminals connected to satellite nodes in a subnet or subnets managed by the local controller.

The sending module 1130 is configured for sending the communication request message to the central controller if the destination terminal information is not found in the first user terminal information table, such that the central controller searches a second user terminal information table for the destination terminal information corresponding to the destination address information, and sends a communication response message containing the destination terminal information to the local controllers after the destination terminal information is found, wherein the second user terminal information table is stored in the central controller and contains terminal information of the user terminals connected to all the satellite nodes in the LEO satellite network.

The receiving module 1110 is further configured for receiving the communication response message sent by the central controller.

The path determination module 1140 is configured for determining a first forwarding path from the source terminal to the destination terminal based on the source terminal information, the destination terminal information and pre-synchronized topology information of the LEO satellite network, and generating a first flow table entry.

The sending module 1130 is further configured for sending the first flow table entry to satellite nodes corresponding to the first flow table entry in the subnet, such that the satellite nodes corresponding to the first flow table entry forwards a data message from the source terminal based on the first flow table entry.

Optionally, the path determination module 1140 may be further configured for: if the destination terminal information is found in the first user terminal information table, determining a second forwarding path from the source terminal to the destination terminal based on the source terminal information, the destination terminal information and pre-obtained topology information of the subnet, and generating a second flow table entry.

The sending module 1130 may be further configured for sending the second flow table entry to satellite nodes corresponding to the second flow table entry in the subnet, such that the satellite nodes corresponding to the second flow table entry forwards the data message from the source terminal based on the second flow table entry.

Optionally, the sending module 1130 may be further configured for sending a probe message to a second satellite node in the subnet, such that the second satellite node sends the probe message to each of neighbor satellite nodes of the second satellite node in the subnet, wherein the second satellite node is any of the satellite nodes in the subnet.

The receiving module 1110 may be further configured for receiving probe response messages sent by the neighbor satellite nodes of the second satellite node in the subnet.

The apparatus may further include: an obtaining module, configured for obtaining topology information of the subnet based on the probe response messages.

The sending module 1130 may be further configured for sending the topology information of the subnet to the central controller, such that the central controller determines a forwarding path between every two satellite nodes in the LEO satellite network based on topology information of subnets managed by respective local controllers, generates a flow table entry corresponding to each of the forwarding paths, and sends the flow table entries to the local controllers.

The receiving module 1110 may be further configured for receiving the flow table entries sent by the central controller.

The apparatus may be further include: a synchronization module, configured for performing flow table matching on each of the flow table entries to synchronize the topology information of the LEO satellite network.

Optionally, the receiving module 1110 may be further configured for receiving a terminal disconnection message sent by a third satellite node; wherein the terminal disconnection message contains terminal information of a third terminal and indicates that the third terminal has been disconnected from the third satellite node and connects to a fourth satellite node.

The apparatus may further include: a deletion module, configured for deleting the terminal information of the third terminal from the first user terminal information table.

The sending module 1130 may be further configured for sending a flow table entry deletion instruction containing the terminal information of the third terminal to the third satellite node, such that the third satellite node deletes a flow table entry corresponding to the terminal information of the third terminal.

The receiving module 1110 may be further configured for receiving a connection request sent by the fourth satellite node, wherein the connection request contains the terminal information of the third terminal.

The path determination module 1140 may be further configured for adding the terminal information of the third terminal into the first user terminal information table, and determining a forwarding path corresponding to the third terminal based on the terminal information of the third terminal and the pre-obtained topology information of the subnet, and generating a new flow table entry.

The sending module 1130 may be further configured for sending the new flow table entry to satellite nodes corresponding to the new flow table entry in the subnet, such that the satellite nodes corresponding to the new flow table entry forwards the data message based on the new flow table entry.

Optionally, the sending module 1130 may be further configured for:

sending a terminal information deletion instruction containing the terminal information of the third terminal to the central controller and the other local controllers, such that the central controller and the other local controllers delete the terminal information of the third terminal from their respective user terminal information tables; and/or sending a terminal information updating instruction containing the terminal information of the third terminal to the central controller and the other local controllers, such that the central controller and the other local controllers add the terminal information of the third terminal into their respective user terminal information tables.

Figure 12:
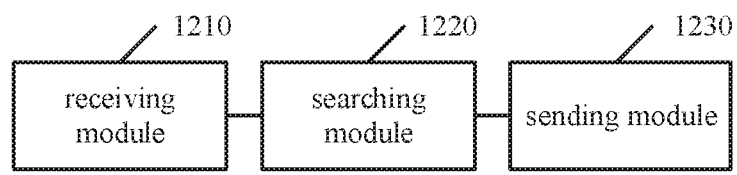
FIG. 12 is a diagram showing a routing apparatus for an SDN-based LEO satellite network which is applicable to a central controller provided by an embodiment of the present invention.

An embodiment of the present invention further provides a routing apparatus for an SDN-based LEO satellite network, which is applicable to a central controller in a control plane of an SDN-based LEO satellite network shown in FIG. 2. As shown in FIG. 12, the routing apparatus includes a receiving module 1210, a searching module 1220 and a sending module 1230.

The receiving module 1210 is configured for receiving a communication request message sent by a first local controller; wherein the communication request message contains source terminal information of a source terminal that requests communication and destination address information of a destination terminal with which the source terminal requests communication, and the first local controller is a local controller for managing a subnet comprising a first satellite node to which the source terminal is connected.

The searching module 1220 is configured for searching a second user terminal table for the destination terminal information corresponding to the destination address information; wherein the second user terminal information table is stored in the central controller and contains terminal information of the user terminals connected to all the satellite nodes in the LEO satellite network.

The sending module 1230 is configured for sending a communication response message containing the destination terminal information to the local controllers after the destination terminal information is found, such that the first local controller determines a forwarding path from the source terminal to the destination terminal based on the source terminal information, the destination terminal information and pre-synchronized topology information of the LEO satellite network, and generates a flow table entry, and sends the flow table entry to satellite nodes corresponding to the flow table entry in the subnet.

Optionally, the receiving module 1210 may be further configured for: receiving, from the local controllers, topology information of subnets respectively managed by the local controllers.

The sending module 1230 may be further configured for: determining a forwarding path between every two satellite nodes in the LEO satellite network based on topology information of the subnets, generating a flow table entry for each of the forwarding paths, and sending the flow table entries to the local controllers, such that each of the local controllers performs flow table matching on the flow table entries to determine the topology information of the LEO satellite network.

Optionally, the apparatus may further include:

a deletion module, configured for upon receiving a terminal information deletion instruction containing terminal information of a third terminal sent by a second local controller, deleting the terminal information of a third terminal from the second user terminal information table, wherein the terminal information deletion instruction is sent by the second local controller to the central controller in response to a request from the third terminal for disconnecting from a third satellite node and connecting to a fourth satellite node, the second local controller is a local controller for managing a subnet comprising the third satellite node and the fourth satellite node; and an adding module, configured for upon receiving a terminal information updating instruction containing the terminal information of the third terminal sent by the second local controller, adding the terminal information of the third terminal into the second user terminal information table, wherein the terminal information updating instruction is sent by the second local controller to the central controller in response to a request from the third terminal for connecting to the fourth satellite node.

In the embodiment of the present invention, the LEO satellite network includes a data plane and a control plane. The data plane includes a plurality of LEO satellite nodes and user terminals connecting to the LEO satellite nodes. The control plane includes a central controller and a plurality of local controllers. A local controller receives a communication request message sent by a first satellite node in the data plane, and searches a first user terminal table for destination terminal information corresponding to the destination address information contained in the communication request message. If the destination terminal information is not found in the first user terminal table, the local controller sends the communication request message to the central controller. The central controller searches a second user terminal table for the destination terminal information. The local controller receives the destination terminal information sent by the central controller, determines a forwarding path from the source terminal to the destination terminal based on the source terminal information, the destination terminal information and pre-synchronized topology information of the LEO satellite network, and generates a flow table entry. The local controller sends the flow table entry to satellite nodes corresponding to the flow table entry in the subnet managed by the local controller, such that the satellite nodes may forward data messages sent by the source terminal based on the flow table entry. The control plane may be located on the earth, and thus the centralized management and control of the data plane are placed on the earth. A local controllers monitors LEO satellite nodes in a subnet or subnets of the local controller. The distance between a local controller and a LEO satellite node is much smaller than the distance between a GEO satellite node and the LEO satellite node, and thus the time delay and the traffic loss of communication are reduced.

Figure 13:
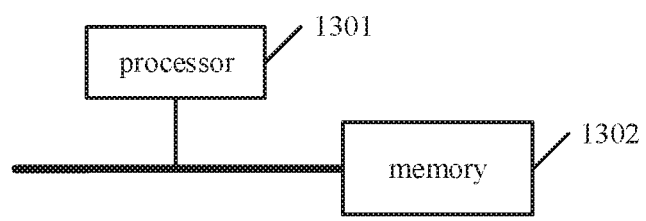
FIG. 13 is a diagram showing the structure of a local controller provided by an embodiment of the present invention.

An embodiment of the present invention further provides a local controller. As shown in FIG. 13, the local controller includes a processor 1301 and a memory 1302. The memory 1302 stores executable instructions that, when executed, cause the processor 1301 to carry out steps of the routing method applicable to the local controller described herein.

Figure 14:
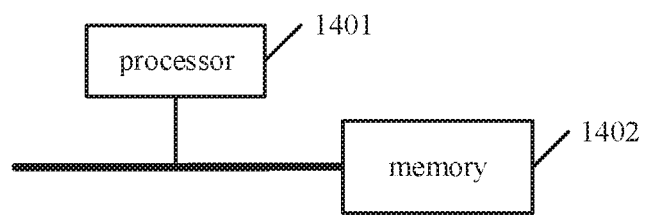
FIG. 14 is a diagram showing the structure of a central controller provided by an embodiment of the present invention.

An embodiment of the present invention further provides a central controller. As shower m FIG. 14, the central controller includes a processor 1401 and a memory 1402. The memory 1402 stores executable instructions that, when executed, cause the processor 1401 to carry out steps of the routing method applicable to the central controller described herein.

The memory may include a RAM (Random Access Memory), or may include a NVM (non-volatile memory), for example at least one disk memory. Optionally, the memory may also be at least one storage apparatus located away from the processor described above.

The processor may be a general-purpose processor, including a CPU (Central Processing Unit), an NP (Network Processor), or the like. The processor may also be a DSP (Digital Signal Processor), an ASIC (Application Specific Integrated Circuit), an FPGA (Field-Programmable Gate Array) other programmable logic devices, discrete gates or transistor logic devices, discrete hardware components.

In the embodiments, the processor of the local controller/central controller reads and executes the executable instructions stored in the memory to implement the following operation. A local controller receives a communication request message sent by a first satellite node in the data plane, and searches a first user terminal information table for destination terminal information corresponding to the destination address information contained in the communication request message. If the destination terminal information is not found in the first user terminal information table, the local controller sends the communication request message to the central controller, such that the central controller searches a second user terminal information table for the destination terminal information. The local controller receives the destination terminal information from the central controller, and determines a forwarding path from the source terminal to the destination terminal based on the source terminal information, the destination terminal information, and pre-synchronized topology information of the LEO satellite network, and generates a flow table entry. The local controller sends the flow table entry to each of satellite nodes corresponding to the flow table entry in the subnet managed by the local controller, such that each of the satellite nodes may forward the data message from the source terminal based on the flow table entry. The control plane may be located on the earth, and thus the centralized management and control of the data plane are placed on the earth. A local controllers monitors LEO satellite nodes in a subnet or subnets of the local controller. The distance between a local controller and a LEO satellite node is much smaller than the distance between a GEO satellite node and the LEO satellite node, and thus the time delay and the traffic loss of communication are reduced.

An embodiment of the present invention further provides a machine readable storage medium having stored thereon a computer program that, when executed by a processor, causes the processor to carry out steps of the routing method applicable to a local controller described herein.

An embodiment of the present invention further provides a machine readable storage medium having stored thereon a computer program that, when executed by a processor, cause the processor to carry out steps of the routing method applicable to a central controller described herein.

In the embodiments, the machine readable storage mediums store computer programs that, when executed, implementing the methods provided herein to realize the following operations. A local controller receives a communication request message sent by a first satellite node in the data plane, and searches a first user terminal information table for destination terminal information corresponding to the destination address information contained in the communication request message. If the destination terminal information is not found in the first user terminal information table, the local controller sends the communication request message to the central controller, such that the central controller searches a second user terminal information table for the destination terminal information. The local controller receives the destination terminal information from the central controller, and determines a forwarding path from the source terminal to the destination terminal based on the source terminal information, the destination terminal information, and pre-synchronized topology information of the LEO satellite network, and generates a flow table entry. The local controller sends the flow table entry to each of satellite nodes corresponding to the flow table entry in the subnet managed by the local controller, such that each of the satellite nodes may forward the data message from the source terminal based on the flow table entry. The control plane may be located on the earth, and thus the centralized management and control of the data plane are placed on the earth. A local controllers monitors LEO satellite nodes in a subnet or subnets of the local controller. The distance between a local controller and a LEO satellite node is much smaller than the distance between a GEO satellite node and the LEO satellite node, and thus the time delay and the traffic loss of communication are reduced.

A brief description is given to embodiments of the local controller, the central controller and the machine readable storage medium in view of their resemblance with the method embodiments described above. Relevant details can be known with reference to the description of the method embodiments.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices including a series of elements include not only those elements listed but also those not specifically listed or the elements intrinsic to these processes, methods, articles, or devices. Without further limitations, elements defined by the wording "comprise(s) a/an . . . ," or "include(s) a/an . . . ," do not exclude additional identical elements in the processes, methods, articles or devices, including the listed elements.

All the embodiments in the description are described in a related way, and description of a component in an embodiment may apply to another containing the same. The description for each embodiment focuses on the differences from other embodiments. In particular, a brief description is provided to embodiments of apparatuses and devices in view of their resemblance with the method embodiments. Relevant details can be known with reference to the description of the method embodiments.

Embodiments described above are only preferable embodiments of the present disclosure, and are not intended to limit the scope of protection of the present disclosure. Any modification, equivalent, and improvement within the spirit and principle of the present disclosure are all within the scope of protection of the present disclosure.

The invention claimed is:

1. A routing method for a software defined network (SDN)-based low earth orbit (LEO) satellite network, wherein the method is applicable to a local controller in a control plane of the SDN-based LEO satellite network, the LEO satellite network comprises the control plane and a data plane, the control plane is located on the ground such that the centralized management and control of the data plane are all placed on the earth, and the control plane comprises a central controller and a plurality of local controllers, each of the plurality of local controllers monitoring LEO satellite nodes in its subnet, and the data plane comprises a plurality of LEO satellite nodes and user terminals connecting to the LEO satellite nodes, and wherein the method comprises:

receiving, by the local controller, a communication request message sent by a first satellite node, wherein the communication request message contains source terminal information of a source terminal that requests communication and destination address information of a destination terminal with which the source terminal requests communication, and the first satellite node is a satellite node to which the source terminal is connected;

searching, by the local controller, a first user terminal information table for destination terminal information corresponding to the destination address information, wherein the first user terminal information table is stored in the local controller and contains terminal information of user terminals connected to satellite nodes in a subnet or subnets managed by the local controller;

sending, by the local controller, the communication request message to the central controller if the destination terminal information is not found in the first user terminal information table, such that the central controller searches a second user terminal information table for the destination terminal information corresponding to the destination address information, and sends a communication response message containing the destination terminal information to the local controllers after the destination terminal information is found, wherein the second user terminal information table is stored in the central controller and contains terminal information of the user terminals connected to all the satellite nodes in the LEO satellite network;

receiving, by the local controller, the communication response message sent by the central controller;

determining, by the local controller, a first forwarding path from the source terminal to the destination terminal based on the source terminal information, the destination terminal information and pre-synchronized topology information of the LEO satellite network, and generating a first flow table entry; and sending, by the local controller, the first flow table entry to satellite nodes corresponding to the first flow table entry in the subnet, such that the satellite nodes corresponding to the first flow table entry forwards a data message from the source terminal based on the first flow table entry.

2. The method of claim 1, wherein after searching the first user terminal information table for the destination terminal information corresponding to the destination address information, the method further comprising:
if the destination terminal information is found in the first user terminal information table, determining a second forwarding path from the source terminal to the destination terminal based on the source terminal information, the destination terminal information and pre-obtained topology information of the subnet, and generating a second flow table entry; and
sending the second flow table entry to satellite nodes corresponding to the second flow table entry in the subnet, such that the satellite nodes corresponding to the second flow table entry forwards the data message from the source terminal based on the second flow table entry.

3. The method of claim 1, wherein the synchronization of the topology information of the LEO satellite network comprises:
sending a probe message to a second satellite node in the subnet, such that the second satellite node sends the probe message to each of neighbor satellite nodes of the second satellite node in the subnet, wherein the second satellite node is any of the satellite nodes in the subnet;
receiving probe response messages sent by the neighbor satellite nodes of the second satellite node in the subnet;
obtaining topology information of the subnet based on the probe response messages;
sending the topology information of the subnet to the central controller, such that the central controller determines a forwarding path between every two satellite nodes in the LEO satellite network based on topology information of subnets managed by respective local controllers, generates a flow table entry corresponding to each of the forwarding paths, and sends the flow table entries to the local controllers;
receiving the flow table entries sent by the central controller; and
performing flow table matching on each of the flow table entries to synchronize the topology information of the LEO satellite network.

4. The method of claim 1, further comprising:
receiving a terminal disconnection message sent by a third satellite node, wherein the terminal disconnection message contains terminal information of a third terminal and indicates that the third terminal has been disconnected from the third satellite node and connects to a fourth satellite node;
deleting the terminal information of the third terminal from the first user terminal information table;
sending a flow table entry deletion instruction containing the terminal information of the third terminal to the third satellite node, such that the third satellite node deletes a flow table entry corresponding to the terminal information of the third terminal;
receiving a connection request sent by the fourth satellite node, wherein the connection request contains the terminal information of the third terminal;

adding the terminal information of the third terminal into the first user terminal information table, and determining a forwarding path corresponding to the third terminal based on the terminal information of the third terminal and the pre-obtained topology information of the subnet, and generating a new flow table entry; and
sending the new flow table entry to satellite nodes corresponding to the new flow table entry in the subnet, such that the satellite nodes corresponding to the new flow table entry forwards the data message based on the new flow table entry.

5. The method of claim 4, wherein after receiving the terminal disconnection message sent by the third satellite node, the method further comprises:
sending a terminal information deletion instruction containing the terminal information of the third terminal to the central controller and the other local controllers, such that the central controller and the other local controllers delete the terminal information of the third terminal from their respective user terminal information tables;
and/or
wherein after receiving the connection request sent by the fourth satellite node, the method further comprises:
sending a terminal information updating instruction containing the terminal information of the third terminal to the central controller and the other local controllers, such that the central controller and the other local controllers add the terminal information of the third terminal into their respective user terminal information tables.

6. A routing method for a software defined network (SDN)-based low earth orbit (LEO) satellite network, wherein the method is applicable to a central controller in a control plane of the SDN-based LEO satellite network, the LEO satellite network comprises the control plane and a data plane, the control plane is located on the ground such that the centralized management and control of the data plane are all placed on the earth, and the control plane comprises the central controller and a plurality of local controllers, each of the plurality of local controllers monitoring LEO satellite nodes in its subnet, and the data plane comprises a plurality of LEO satellite nodes and user terminals connecting to the LEO satellite nodes, and wherein the method comprises:
receiving, by the central controller, a communication request message sent by a first local controller; wherein the communication request message contains source terminal information of a source terminal that requests communication and destination address information of a destination terminal with which the source terminal requests communication, and the first local controller is a local controller for managing a subnet comprising a first satellite node to which the source terminal is connected;
searching, by the central controller, a second user terminal table for the destination terminal information corresponding to the destination address information; wherein the second user terminal information table is stored in the central controller and contains terminal information of the user terminals connected to all the satellite nodes in the LEO satellite network; and
sending, by the central controller, a communication response message containing the destination terminal information to the local controllers after the destination terminal information is found, such that the first local controller determines a forwarding path from the source terminal to the destination terminal based on the source terminal information, the destination terminal information and pre-synchronized topology information of the LEO satellite network, and generating a flow table entry, and sends the flow table entry to satellite nodes corresponding to the flow table entry in the subnet.

7. The method of claim 6, further comprising:
receiving, from the local controllers, topology information of subnets respectively managed by the local controllers; and
determining a forwarding path between every two satellite nodes in the LEO satellite network based on topology information of the subnets, generating a flow table entry for each of the forwarding paths, and sending the flow table entries to the local controllers, such that each of the local controllers performs flow table matching on the flow table entries to determine the topology information of the LEO satellite network.

8. The method of claim 6, further comprising:
upon receiving a terminal information deletion instruction containing terminal information of a third terminal sent by a second local controller, deleting the terminal information of a third terminal from the second user terminal information table, wherein the terminal information deletion instruction is sent by the second local controller to the central controller in response to a request from the third terminal for disconnecting from a third satellite node and connecting to a fourth satellite node, the second local controller is a local controller for managing a subnet comprising the third satellite node and the fourth satellite node; and/or
upon receiving a terminal information updating instruction containing the terminal information of the third terminal sent by the second local controller, adding the terminal information of the third terminal into the second user terminal information table, wherein the terminal information updating instruction is sent by the second local controller to the central controller in response to a request from the third terminal for connecting to the fourth satellite node.

9. A local controller, comprising a processor and a memory, the memory having stored thereon executable instructions that, when executed, cause the processor to carry out the method of claim 1.

10. A central controller, comprising a processor and a memory, the memory having stored thereon executable instructions that, when executed, cause the processor to carry out the method of claim 6.

* * * * *